June 21, 1966  R. DIENER  3,257,568
TRANSISTOR CIRCUIT FOR CONTROLLING AND RECTIFYING
THE CURRENT SUPPLIED TO A CONSUMER
Filed March 18, 1963

INVENTOR
RUDOLF DIENER by E. M. Squire
his attorney

United States Patent Office 3,257,568
Patented June 21, 1966

3,257,568
TRANSISTOR CIRCUIT FOR CONTROLLING AND RECTIFYING THE CURRENT SUPPLIED TO A CONSUMER
Rudolf Diener, Zurich, Switzerland, assignor to Eldima A.G., Zurich, Switzerland
Filed Mar. 18, 1963, Ser. No. 265,968
Claims priority, application Switzerland, Mar. 22, 1962, 3,396/62
3 Claims. (Cl. 307—88.5)

The present invention relates to an electric circuit arrangement for controlling the supply of current to a consumer.

With known circuit arrangements of this kind comprising a rectifier and a power transistor, a constant or approximately constant voltage is supplied by the rectifier, and the current supply to the consumer is regulated thereby that the resistance of the consumer circuits, which depends on the emitter-collector resistance of the power transistor is varied by adjusting the emitter-base voltage.

It is a primary object of the present invention to reduce the power losses occurring in the said power transistor and to thereby improve the efficiency of the circuit arrangement. It is also an object of the invention to increase the permissible maximum current in such a circuit arrangement by reducing the resistance heating of said power transistor.

With these and other objects in view which will become apparent later from this specification and the accompanying drawings, I provide an electric circuit arrangement for controlling the current supplied to a consumer, comprising in combination: a rectifier connected to an extraneous source of alternating current and in operation generating a pulsating direct voltage, an even number of control transistors connected with one another in a cascade, a power transistor connected to said consumer, the first one of said cascade of control transistors and said power transistor being connected with said rectifier and in operation being supplied with said pulsating direct voltage, and adjustment means regulating the collector current of said first control transistor in such a manner that in a middle time interval of each direct voltage pulse no current flows through said power transistor to said consumer, the length of said interval being determined by said adjustment means.

These and other features of my said invention will be clearly understood from the folowing description of a preferred embodiment thereof, given by way of example with reference to the accompanying drawing, in which.

Figure 1:
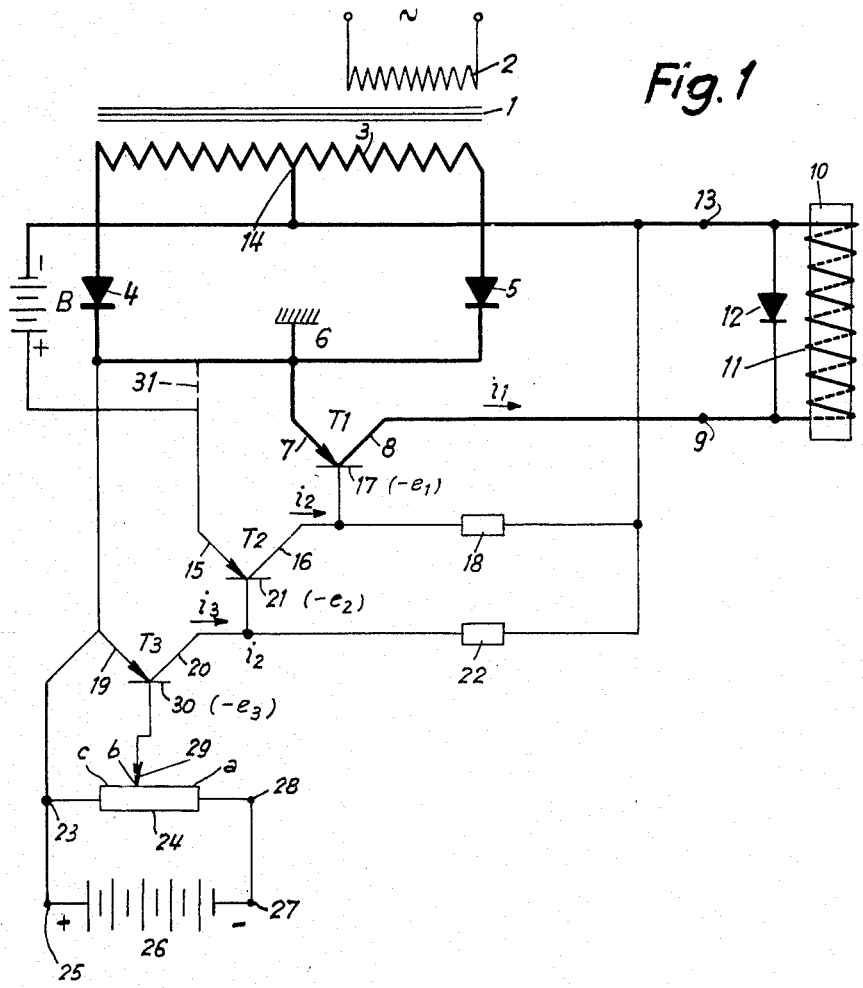
FIG. 1 shows a current control circuit.

The circuit illustrated includes a transformer 1, the primary winding 2 of which is connected to the alternating current mains. With the end terminals of a center tapped secondary winding 3 two oppositely directed diodes 4, 5 are connected, which are on the other hand connected with one another by a grounded conductor 6. The conductor 6 is connected with the emitter 7 of a first transistor $T_1$, whose collector 8 is connected with a terminal 9 for the connection of a load consisting for example of an exciter coil 11 surrounding a magnetic core 10 having a voltage limiting diode 12 shunted in parallel thereto. The other terminal 13 for the connection of the load 11, 12 is connected with the midpoint 14 of the secondary coil 3. It will be seen that, assuming the transistor $T_1$ to be conductive, i.e. the resistance between the emitter 7 and collector 8 thereof to be low, the two diodes 4 and 5 are rectifying both half-waves of the mains voltage, so that a full-wave pulsating direct current flows from the positive conductor 6 to the negative mid point 14 through the inductance constituted by the coil 11, which pulsating direct current is smoothed by the diode 12.

A battery B has its negative pole connected with the midpoint 14 of the secondary coil 3, and its positive pole connected with the emitter 15 of a second transistor $T_2$, whose collector 16 is connected on the one hand with the base 17 of the transistor $T_1$, and on the other hand through a resistor 18 with the midpoint 14.

With the conductor 6 also the emitter 19 of a third transistor $T_3$ is connected, whose collector 20 is connected on the one hand with the base 21 of the transistor $T_2$, and on the other hand through a resistor 22 with the midpoint 14.

Finally one terminal 23 of a high resistance potentiometer 24 and the positive pole 25 of a battery 26 are connected to the grounded conductor 6. The negative pole 27 of the battery is connected with the other terminal 28 of the potentiometer, while the movable contact 29 of the potentiometer 24 is connected with the base 30 of the transistor $T_3$.

In a circuit arranged in accordance with the diagram illustrated the half-waves supplied by the rectifier 3–6 had a maximum voltage of 12 volts, while the battery B supplied a direct voltage of about 15 volts, and the battery 26 supplied a direct voltage of 2 volts. The resistor 18 connected in the collector circuit of the transistor $T_2$ had a value $r_2$ of about 700 ohms, and the resistor 22 connected into the collector circuit of the transistor $T_3$ had a value $r_3$ of about 15,000 ohms.

Figure 2A:
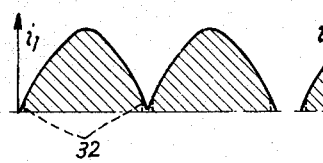
FIGS. 2a–2c show graphs for the explanation of the functioning thereof.
Figure 2B:
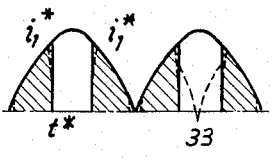
Figure 2C:
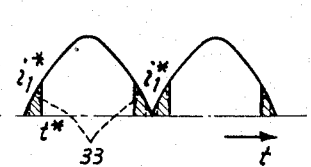

By adjusting the bias voltage of the transistor $T_3$ by means of the potentiometer 24 the current supplied to the coil 11 could be regulated between zero and about 2 amps the power losses amounting only to about 1%. In order to investigate the functioning of the circuit, the collector current $i$ of the transistor $T_1$ has been checked by means of an oscillograph, with the following result:

When the potentiometer tapping 29 was positioned at $a$ in the vicinity of the negative terminal 28, the current $i_1$ as a function of time $t$ shows the shape of complete half-waves as in FIG. 2a. When the movable potentiometer contact 29 is adjusted to the position illustrated, designated by $b$, the current $i_1$ becomes zero, as shown in FIG. 2b, in a middle interval of a half-wave period of the alternating voltage, i.e. it increases only up to a certain value $i_1$*, then suddenly becomes zero and then starts again at the same value $i_1$*, when the voltage generating the same diminishes: When the tapping 29 is shifted to a point $c$ situated in the vicinity of the positive terminal 23 connected with the emitter 19 of the transistor $T_3$, the currentless middle interval of the half-period becomes very large in accordance with FIG. 2c, and when the tapping 29 or the base 30 has the same potential as the emitter 19, no current at all is supplied to the load 11, 12.

This manner of operation of the circuit as ascertained experimentally may be explained qualitatively about as follows:

The emitter-collector resistance of the transistor $T_1$, which for brevity will be denoted as its resistance $w_1$, depends on the emitter-base voltage, or since the emitter 7 is earthed, from the magnitude (absolute value) of the negative potential $|-e_1|$ of the base 17, this potential in turn depending on the resistance ratio of the voltage divider formed by the transistor $T_2$ and the resistor 18 and the voltage applied to this voltage divider. The fact, that with increasing voltage the current $i_1$ is interrupted at the moment $t$* (see FIGS. 2b and 2c) indicates, that at this moment the magnitude $|-e_1|$ of the potential of the base 17 suddenly becomes very low. Since the voltage applied to the voltage divider $T_2$, 18 is constant, namely equal to the voltage of the battery B, this means that the resistance $w_2$ of the transistor $T_2$ suddenly becomes very low. A condition for this is that the magnitude $|-e_2|$ of the potential of the base 21 exceeds a certain threshold value $|-e_2|_0$; upon increase of the voltage half-wave applied to the voltage divider $T_3$, 22 it will depend on the resistance $w_3$ of the transistor $T_3$, whether and when this threshold value $|-e_2|_0$ is exceeded. When the magnitude $|-e_3|$ of the potential of the base 30 of the transistor $T_3$ is high (with the tapping at the point $a$), the resistance $w_3$ is so low, that the voltage drop $|-e_2|=w_3 \cdot i_3$ remains smaller than $|-e_2|_0$ during the entire half-wave. When the magnitude $|-e_3|$ is reduced (tappings located at the point $b$ or $c$, respectively), $|-e_2|$ will eventually reach $|-e_2|_0$ in each half-period, the moment $t^*$, when this occurs, lying the nearer to the zero passage of the voltage, the lower is $|-e_3|$; for $|-e_3|=1$ the magnitude of $w_3$ becomes so high that $|-e_2|$ always exceeds $|-e_2|_0$, and accordingly the transistor $T_1$ does not supply any current $i_1$ at all. It is clear that when in a voltage half-period the current $i_1$ is interrupted at a value $i_1^*$, it will start again practically at the same value $i_1^*$ when the voltage decreases.

With a circuit arrangement of the kind described it has been achieved to control the circuit in a 400 watt exciter coil of an electromagnetically controlled valve nearly without loss, with an extremely fine and stable adjustment of the current intensity.

It should be remarked that the present circuit arrangement would in principle be feasible alternatively with a half-wave rectifier which rectifies only one voltage half-wave, however it is obviously preferable to use the full-wave rectifier 3-6 rectifying both half-cycles of the voltage waves. In any case the rectifier must furnish a pulsating voltage which periodically becomes zero and by no means a constant direct voltage; accordingly no capacitor is to be connected between the midpoint 14 of the secondary winding 3 and the conductor 6. It would be possible to control the transistor $T_3$ by the aid of two further transistors in the same manner as the power transistor $T_1$ is controlled by the transistors $T_2$ and $T_3$. Accordingly a cascade of four control transistors could be arranged before the power transistor $T_1$. Since the resistances of the successive resistors are alternately high and low, it is however not possible to use a cascade of an odd number of control transistors. The pulsating voltage applied to the first control transistor $T_3$ need not necessarily be derived from the same rectifier which feeds the power transistor $T_1$; however this is obviously particularly simple and convenient. In order to increase the output, further power transistors could be shunted parallel to the power transistor $T_1$. Instead of a solenoid coil, for example the field windings of an electric motor or a heating resistor or any other resistive, inductive or capacitive impedance may be provided as the consumer or as part thereof.

It is not absolutely necessary to provide the battery B instead, the emitter 15 of the second control transistor $T_2$ (and if desired the emitters of two further transistors provided between the same and the power transistor $T_1$) may be connected with the conductor 6, as indicated as a modification by a dotted line 31. In this case, however, a somewhat less favourable result is attained, as experimentally ascertained, since the current $i_1$ at the adjustment of the potentiometer tapping 29 corresponding to FIG. 2a is interrupted for a short while at the beginning and end of each half-period, as indicated by the dotted lines 33. Moreover the flanks of the currentless middle intervals are no longer perpendicular to the time co-ordinate axis, but are slightly inclined and curved, as indicated by the dotted lines 33.

While I have herein described and illustrated in the accompanying drawing what may be considered a typical and particularly useful embodiment of my said invention, I wish it to be understood, that I do not limit myself to the particular details and values described and illustrated; for obvious modifications will occur to a person skilled in the art.

What I claim as my invention and desire to secure by Letters Patent is:

1. A rectifier circuit comprising: an alternating current supply circuit; a transformer having a primary winding connected for energization by said supply circuit and a center-tapped secondary winding energized from said primary winding; a pair of load terminals; a conductor extending from said center tap to one of said load terminals; a pair of rectifier elements, each rectifier having one of its terminals each of the same predetermined polarity separately connected to one of the end terminals of said secondary winding, the terminals of opposite polarity of both rectifier elements being connected together for full-wave rectification; a first transistor having emitter, collector and base electrodes, said first transistor having its emitter-collector circuit connected between said rectifier terminals of said opposite polarity and the other one of said load terminals for controlling the flow of rectified current to said load terminals; a second transistor having emitter, collector and base electrodes, said second transistor having its emitter-collector circuit connected between the one of said load terminals and the base of said first transistor; a first resistor connected between said center tap and said base of said first transistor; a third transistor having emitter, collector and base electrodes, said third transistor having its emitter-collector circuit connected between said rectifier terminals of said opposite polarity and the base of said second transistor; a second resistor connected to said center tap and the base of said second transistor; and an adjustable source of biasing potential connected between said rectifier terminals of said opposite polarity and the base of said third transistor.

2. A rectifier circuit comprising: an alternating current supply circuit; a transformer having a primary winding connected for energization by said supply circuit and a center-tapped secondary winding energized from said primary winding; a pair of load terminals; a conductor extending from said center tap to one of said load terminals; a pair of rectifier elements, each rectifier having one of its terminals each of the same predetermined polarity, separately connected to one of the end terminals of said secondary winding, the terminals of opposite polarity of both rectifier elements being connected together for full-wave rectification; a first transistor having emitter, collector and base electrodes, said first transistor having its emitter-collector circuit connected between said rectifier terminals of said opposite polarity and the other one of said load terminals; a continuous source of constant unidirectional biasing potential having one terminal connected to said center tap, the potential of said source exceeding the peak voltage of the half-waves rectified by said rectifier elements, the polarity of said source being in the same direction as said rectifier elements; a second transistor having emitter, collector and base electrodes, said second transistor having its emitter-collector circuit connected between the other terminal of said source and the base of said first transistor; a first resistor connected between said center tap and said base of said first transistor; a third transistor having emitter, collector and base electrodes, said third transistor having its emitter-collector circuit connected between said rectifier terminals of said opposite polarity and the base of said second transistor; a second resistor connected to said center tap and the base of said second transistor; and an adjustable source of unidirectional biasing potential connected between said rectifier terminals of said opposite polarity and the base of said third transistor.

3. A rectifier circuit comprising: an alternating current supply circuit; a transformer having a primary winding connected for energization by said supply circuit and a center-tapped secondary winding energized from said primary winding; a pair of load terminals; a conductor extending from said center tap to one of said load terminals; a pair of rectifier elements, each of said rectifier elements having one of its terminals of the same predetermined polarity separately connected to one of the end terminals of said secondary winding, the terminals of opposite polarity of both rectifier elements being connected together for full-wave rectification; a first transistor having emitter, collector and base electrodes, said first transistor having its emitter-collector circuit connected between said terminals of opposite polarity and the other one of said load terminals; a continuous source of constant unidirectional biasing potential having one terminal connected to said center tap, the potential of said source exceeding the peak voltage of the half-waves rectified by said rectifier elements, the polarity of said source being in the same direction as said rectifier elements; a second transistor having emitter, collector and base electrodes, said second transistor having its emitter-collector circuit connected between the other terminal of said source and the base of said first transistor; a first resistor connected between said center tap and said base of said first transistor; a third transistor having emitter, collector and base electrodes, said third transistor having its emitter-collector circuit connected between said terminals of opposite polarity and the base of said second transistor; a second resistor connected to said center tap and the base of said second transistor; and means including a constant voltage source of unidirectional potential and an adjustable potentiometer connected between said terminals of opposite polarity and the base of said third transistor, for biasing said third transistor.

References Cited by the Examiner

UNITED STATES PATENTS

| | | | |
|---|---|---|---|
| 3,068,392 | 12/1962 | Santelmann | 323—22 |
| 3,098,192 | 7/1963 | Levy et al. | |
| 3,102,225 | 8/1963 | Kenny et al. | 323—22 |
| 3,124,698 | 3/1964 | Semmer et al. | 323—22 |
| 3,156,860 | 11/1964 | Paynter | 323—22 |

GEORGE N. WESTBY, *Primary Examiner.*

ARTHUR GAUSS, JOHN W. HUCKERT, *Examiners.*

R. H. EPSTEIN, *Assistant Examiner.*